US010304192B2

(12) United States Patent
Xu et al.

(10) Patent No.: US 10,304,192 B2
(45) Date of Patent: May 28, 2019

(54) FAST, PROGRESSIVE APPROACH TO SUPERVOXEL-BASED SPATIAL TEMPORAL VIDEO SEGMENTATION

(71) Applicant: SONY CORPORATION, Tokyo (JP)

(72) Inventors: Xun Xu, Cupertino, CA (US); Akira Nakamura, Yokohama (JP)

(73) Assignee: Sony Corporation, Tokyo (JP)

( * ) Notice: Subject to any disclaimer, the term of this patent is extended or adjusted under 35 U.S.C. 154(b) by 91 days.

(21) Appl. No.: 15/646,711

(22) Filed: Jul. 11, 2017

(65) Prior Publication Data

US 2019/0019292 A1    Jan. 17, 2019

(51) Int. Cl.
*G06T 7/11* (2017.01)
*G06T 7/90* (2017.01)
*G06T 5/00* (2006.01)
*G06T 7/162* (2017.01)

(52) U.S. Cl.
CPC ............. *G06T 7/11* (2017.01); *G06T 5/005* (2013.01); *G06T 7/162* (2017.01); *G06T 7/90* (2017.01); *G06T 2207/10016* (2013.01); *G06T 2207/20072* (2013.01)

(58) Field of Classification Search
CPC ... G06T 7/11; G06T 5/005; G06T 7/90; G06T 2207/10016
See application file for complete search history.

(56) References Cited

U.S. PATENT DOCUMENTS

| 2013/0156314 | A1* | 6/2013 | Pham ............... G06T 7/155 382/173 |
| 2013/0243314 | A1 | 9/2013 | Civit et al. |
| 2013/0342559 | A1 | 12/2013 | Reso et al. |
| 2014/0119604 | A1* | 5/2014 | Mai ............... G06K 9/00624 382/103 |
| 2015/0170370 | A1* | 6/2015 | Ukil ............... G09G 5/377 382/154 |
| 2015/0186752 | A1* | 7/2015 | Xu ............... G06F 21/32 382/128 |
| 2015/0234863 | A1* | 8/2015 | Lilje ............... G06F 17/30259 382/103 |
| 2015/0235374 | A1* | 8/2015 | Wang ............... G06K 9/4604 382/160 |

(Continued)

OTHER PUBLICATIONS

Holzer, Markus, "Over-Segmentation of 3D Medical Image Volumes based on Monogenic Cues", 19th Computer Vision Winter Workshop, Feb. 3-5, 2014.

(Continued)

*Primary Examiner* — Ming Y Hon
(74) *Attorney, Agent, or Firm* — Haverstock & Owens LLP

(57) ABSTRACT

The two-step architecture of the supervoxel-based spatial temporal video segmentation method ensures speed and scalability. The computationally intensive first step uses a highly efficient super-voxel segmentation method. The second step is done over pre-grouped super-voxels, hence has much lower temporal and spatial complexity. The progressive segmentation scheme deployed in the first step enables segmenting huge input volume part by part, without loading all the data into the memory which may be infeasible. At the same time, the progressive segmentation is able to effectively prevent seam artifacts, leading to segmentation results virtually identical to those of whole volume processing.

24 Claims, 3 Drawing Sheets

(56) References Cited

U.S. PATENT DOCUMENTS

| | | | | |
|---|---|---|---|---|
| 2015/0235377 A1* | 8/2015 | Wang | ............... | G06F 17/30858 |
| | | | | 382/103 |
| 2016/0189388 A1* | 6/2016 | Gupta | ...................... | G06T 7/11 |
| | | | | 382/180 |
| 2016/0335524 A1* | 11/2016 | Bremer | ..................... | G06T 7/10 |
| 2017/0236289 A1* | 8/2017 | Achanta | ................... | G06K 9/34 |
| | | | | 382/173 |
| 2018/0288451 A1* | 10/2018 | Asif | ................ | H04N 21/23605 |

OTHER PUBLICATIONS

Felzenszwalb, Pedro F., "Efficient Graph-Based Image Segmentation".

Grundmann, Matthias, "Efficient Hierarchical Graph-Based Video Segmentation", http://www.cc.gatech.edu/cpl/projects/videosegmentation.

Achanta, Radhakrishna, "SLIC Superpixels Compared to State-of the-Art Superpixel Methods", IEEE Transactions on Pattern Analysis and Machine Intelligence, vol. 34, No. 11, Nov. 2012.

\* cited by examiner

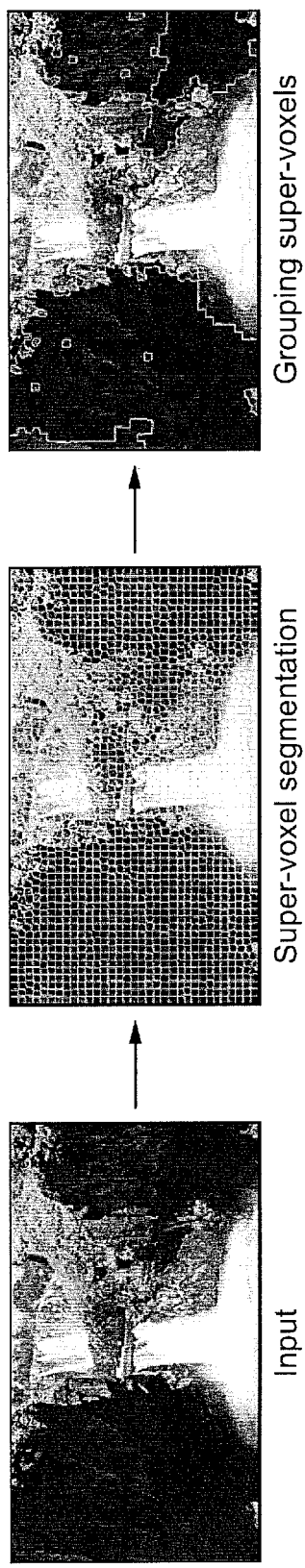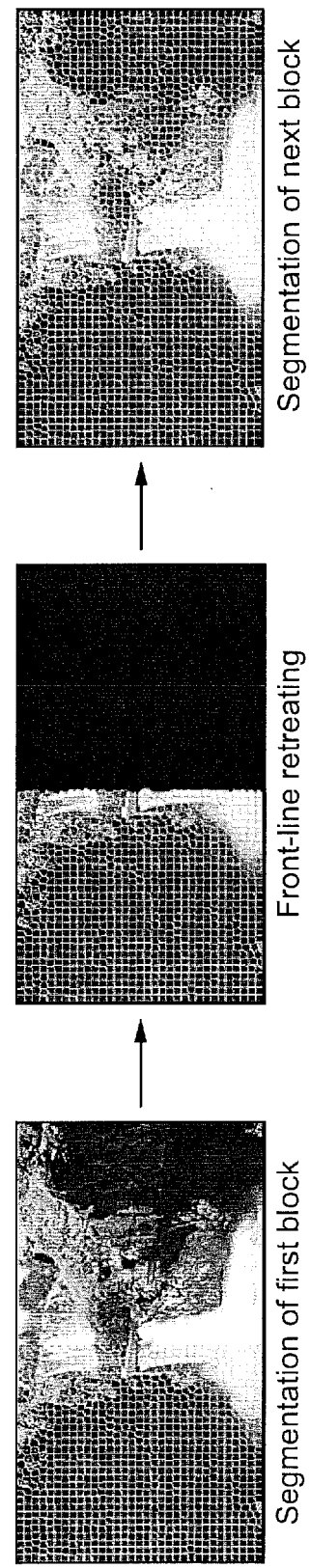

FAST, PROGRESSIVE APPROACH TO SUPERVOXEL-BASED SPATIAL TEMPORAL VIDEO SEGMENTATION

FIELD OF THE INVENTION

The present invention relates to video segmentation. More specifically, the present invention relates to supervoxel-based video segmentation.

BACKGROUND OF THE INVENTION

Video segmentation is a highly challenging task, especially when a video of high resolution and long duration is being processed. Video segmentation is an important task in video processing, and serves as a pre-processing step for many other tasks, such as de-noising and super-resolution. For videos of high resolution and long duration, high quality video segmentation is still a challenging tasks due to the large amount of computation involved.

SUMMARY OF THE INVENTION

The two-step architecture of the supervoxel-based spatial temporal video segmentation method ensures speed and scalability. The computationally intensive first step uses a highly efficient super-voxel segmentation method. The second step is done over pre-grouped super-voxels, hence has much lower temporal and spatial complexity. The progressive segmentation scheme deployed in the first step enables segmenting huge input volume part by part, without loading all the data into the memory which may be infeasible. At the same time, the progressive segmentation is able to effectively prevent seam artifacts, leading to segmentation results virtually identical to those of whole volume processing.

In one aspect, a method programmed in a non-transitory memory of a device comprises acquiring video content, segmenting the video content into groups of super-voxels and grouping the groups of super-voxels into segments. The voxels in each group of the groups of super-voxels are visually similar in color, texture or both. Determining the voxels are visually similar in color is performed by comparing and matching the color, the texture or both. Segmenting the video content into the groups of super-voxels includes over-segmentation. Boundaries between super-voxels are preserved. Segmenting the video content into the groups of super-voxels is by simple linear iterative clustering. Segmenting the video content into the groups of super-voxels uses progressive segmentation which is part-by-part segmentation by splitting the video content into spatial-temporal pieces, and the spatial-temporal pieces are processed sequentially in a scan-line order. The progressive segmentation uses a front-line retreating strategy including: when processing each piece, a mask array marking the voxels that have been segmented is stored, wherein before segmentation, none of the voxels are marked, and after segmentation, every voxel is marked except for those belonging to super-voxels on the front-line boundary of a piece, wherein before a following piece is segmented, unmarked voxels of all processed neighboring pieces are added to a current piece, and all of the voxels are segmented into super-voxels using a selected segmentation method. Grouping super-voxels into larger segments is based on a modified graph-based segmentation algorithm which groups super-voxels instead of individual voxels. Grouping the groups of super-voxels into the segments includes measuring a dissimilarity between two super-voxels, including measuring an $X^2$ distance between a color histogram of the super-voxels.

In another aspect, a system comprises a lens, a sensor configured for acquiring video content and a processing component configured for segmenting the video content into groups of super-voxels and grouping the groups of super-voxels into segments. The voxels in each group of the groups of super-voxels are visually similar in color, texture or both. The voxels are visually similar in color is performed by comparing and matching the color, the texture or both. Segmenting the video content into the groups of super-voxels includes over-segmentation. Boundaries between super-voxels are preserved. Segmenting the video content into the groups of super-voxels is by simple linear iterative clustering. Segmenting the video content into the groups of super-voxels uses progressive segmentation which is part-by-part segmentation by splitting the video content into spatial-temporal pieces, and the spatial-temporal pieces are processed sequentially in a scan-line order. The progressive segmentation uses a front-line retreating strategy including: when processing each piece, a mask array marking the voxels that have been segmented is stored, wherein before segmentation, none of the voxels are marked, and after segmentation, every voxel is marked except for those belonging to super-voxels on the front-line boundary of a piece, wherein before a following piece is segmented, unmarked voxels of all processed neighboring pieces are added to a current piece, and all of the voxels are segmented into super-voxels using a selected segmentation method. Grouping super-voxels into larger segments is based on a modified graph-based segmentation algorithm which groups super-voxels instead of individual voxels. Grouping the groups of super-voxels into the segments includes measuring a dissimilarity between two super-voxels, including measuring an $X^2$ distance between a color histogram of the super-voxels.

In another aspect, a camera device comprises a lens, a sensor configured for acquiring video content, a non-transitory memory for storing an application, the application for: segmenting the video content into groups of super-voxels and grouping the groups of super-voxels into segments and a processing component coupled to the memory, the processing component configured for processing the application. The voxels in each group of the groups of super-voxels are visually similar in color, texture or both. Determining the voxels are visually similar in color is performed by comparing and matching the color, the texture or both. Segmenting the video content into the groups of super-voxels includes over-segmentation. Boundaries between super-voxels are preserved. Segmenting the video content into the groups of super-voxels is by simple linear iterative clustering. Segmenting the video content into the groups of super-voxels uses progressive segmentation which is part-by-part segmentation by splitting the video content into spatial-temporal pieces, and the spatial-temporal pieces are processed sequentially in a scan-line order. The progressive segmentation uses a front-line retreating strategy including: when processing each piece, a mask array marking the voxels that have been segmented is stored, wherein before segmentation, none of the voxels are marked, and after segmentation, every voxel is marked except for those belonging to super-voxels on the front-line boundary of a piece, wherein before a following piece is segmented, unmarked voxels of all processed neighboring pieces are added to a current piece, and all of the voxels are segmented into super-voxels using a selected segmentation method.

Grouping super-voxels into larger segments is based on a modified graph-based segmentation algorithm which groups super-voxels instead of individual voxels. Grouping the groups of super-voxels into the segments includes measuring a dissimilarity between two super-voxels, including measuring an $X^2$ distance between a color histogram of the super-voxels.

BRIEF DESCRIPTION OF THE DRAWINGS

FIG. 1 illustrates a diagram of the overall workflow of the segmentation framework according to some embodiments.

FIG. 2 illustrates a diagram of the workflow of the progressive segmentation framework according to some embodiments.

DETAILED DESCRIPTION OF THE PREFERRED EMBODIMENT

Figure 3:
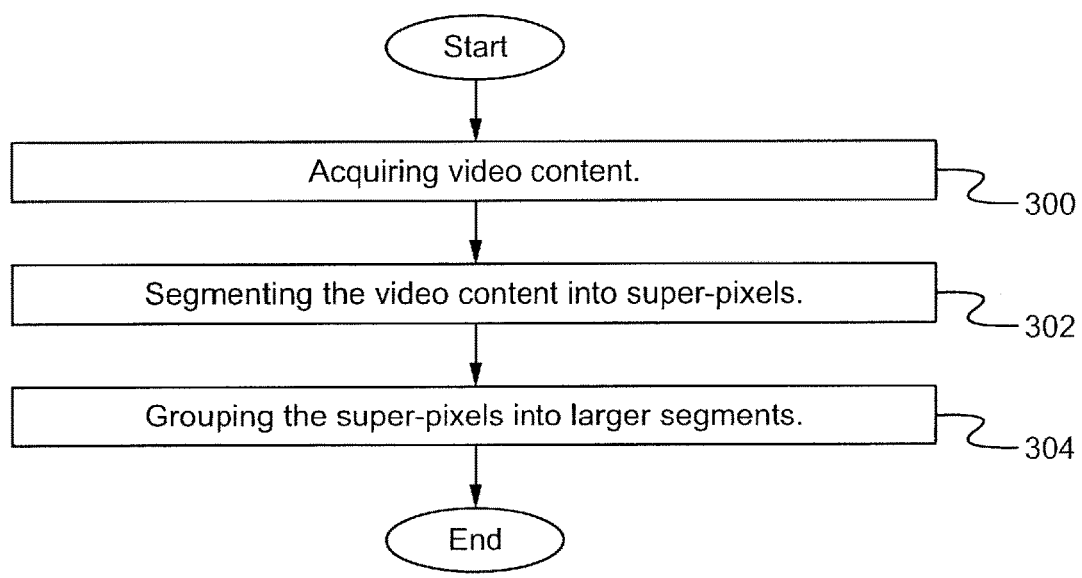
FIG. 3 illustrates a flowchart of a method of supervoxel-based spatial temporal video segmentation according to some embodiments.

A fast and scalable method for video segmentation is described. The method is fast and works in a two-step fashion. The first, most computationally expensive step, is achieved by a method that is extremely efficient. The method is highly scalable partly due to this efficient segmentation method which uses a novel progressive processing scheme that is able to effectively handle very large video sequences.

The video segmentation approach involves two steps. In the first step, the video as a spatial-temporal volume is segmented into super-voxels. This is the most computationally expensive step, thus a highly efficient algorithm is utilized. Furthermore, a progressive scheme is designed to process large video input, providing high scalability to the overall framework. In the second step, the super-voxels are further grouped into larger segments, which are visually consistent and semantically meaningful. The overall workflow of the segmentation framework is shown in FIG. 1, while the details of these steps are described herein.

Spatial-temporal Super-Voxel Segmentation

The first step in the two-step framework involves segmenting the pixels, particularly voxels in a video input, into groups referred to as super-voxels. The voxels grouped into one super-voxel are visually similar, in the sense of color and/or texture. The visual similarity in the sense of color and/or texture is able to be determined in any manner such as comparing and matching color values and/or texture values. In an original video, one visually consistent region (e.g. a part of an object), is usually segmented into multiple super-voxels; therefore, such segmentation is often referred to as over-segmentation. The purpose of over-segmenting the input video into super-voxels is to dramatically reduce the amount of visual units to be processed in later steps. As one super-voxel usually contains $10^2 \sim 10^3$ voxels, the processing complexity of later modules is able to be reduced by 2 or 3 magnitudes. Oversegmentation should preserve prominent boundaries (e.g. those between a foreground object and the background), in the original input. In other words, the boundaries between super-voxels should contain all important boundaries in the original input.

Any reasonably good super-voxel segmentation method is able to be used in this step. However, as this step is most computationally expensive since it works over all input voxels, a highly efficient method is preferred to provide the overall speed and scalability of the whole framework. In some embodiments, a method referred to as Simple Linear Iterative Clustering (SLIC) is utilized, which is a very efficient (it has linear complexity with respect to the number of voxels) method that is able to lead to reasonably good segmentation quality.

Progressive Segmentation Scheme for Large Video Input

A video sequence, especially one of high resolution and long duration, is difficult to be loaded entirely into memory to be processed. A scalable framework for video segmentation should involve a scheme to handle large input without requiring processing it as a whole. The first step is done in a part-by-part fashion, which is called progressive segmentation. FIG. 2 illustrates a diagram of the workflow of the progressive segmentation framework according to some embodiments.

In the progressive segmentation scheme, the original video volume is first split into smaller spatial-temporal chunks. These chunks are then processed sequentially, in a scan-line order.

Naive processing of these chunks would lead to an artificial seam on the boundary between any pair of neighboring chunks. In the progressive segmentation scheme, a front-line retreating strategy is employed to solve this problem. The front-line retreating strategy works as described herein.

When processing each chunk, a mask array marking the voxels that have been processed (segmented) is kept. Before segmentation, clearly none of the voxels are marked. After segmentation, every voxel is marked except for those belonging to super-voxels on the front-line boundary of this chunk (e.g., the boundary between this chunk and any of the chunks that have not been processed). Before a following chunk is processed, the unmarked voxels of all processed neighboring chunks are added to the current chunk, and all of these voxels are segmented into super-voxels using the selected segmentation method.

Graph-based segmentation on Top of Super-voxels

Graph-based segmentation is a method that is able to result in visually consistent and semantically meaningful segmentation. The original method was designed for image segmentation and works on pixels (e.g., grouping pixels into segments). The method described herein is adapted to work on spatial-temporal super-voxels. The main difference is replacing the voxel with super-voxel as the basic element (node) to be processed. Accordingly, the original distance measure for voxels is replaced by a distance measuring the dissimilarity between two super-voxels. As a supervoxel is an ensemble of spatially connected voxels, more sophisticated metrics are able to be used. One possibility is using $X^2$ distance between the super-voxels' color histogram. Depending on the specific application, other metrics are able to be included as well to measure the dissimilarity in regard of other aspects (e.g. texture or motion).

FIG. 3 illustrates a flowchart of a method of supervoxel-based spatial temporal video segmentation according to some embodiments. In the step 300, video content is acquired or transmitted. For example, a digital camcorder is used to take a video. In another example, video content is transmitted from one device to another. In the step 302, the video content is segmented into super-voxels. In the step 304, the super-voxels are grouped into larger segments. In some embodiments, fewer or additional steps are implemented. In some embodiments, the order of the steps is modified.

Figure 4:
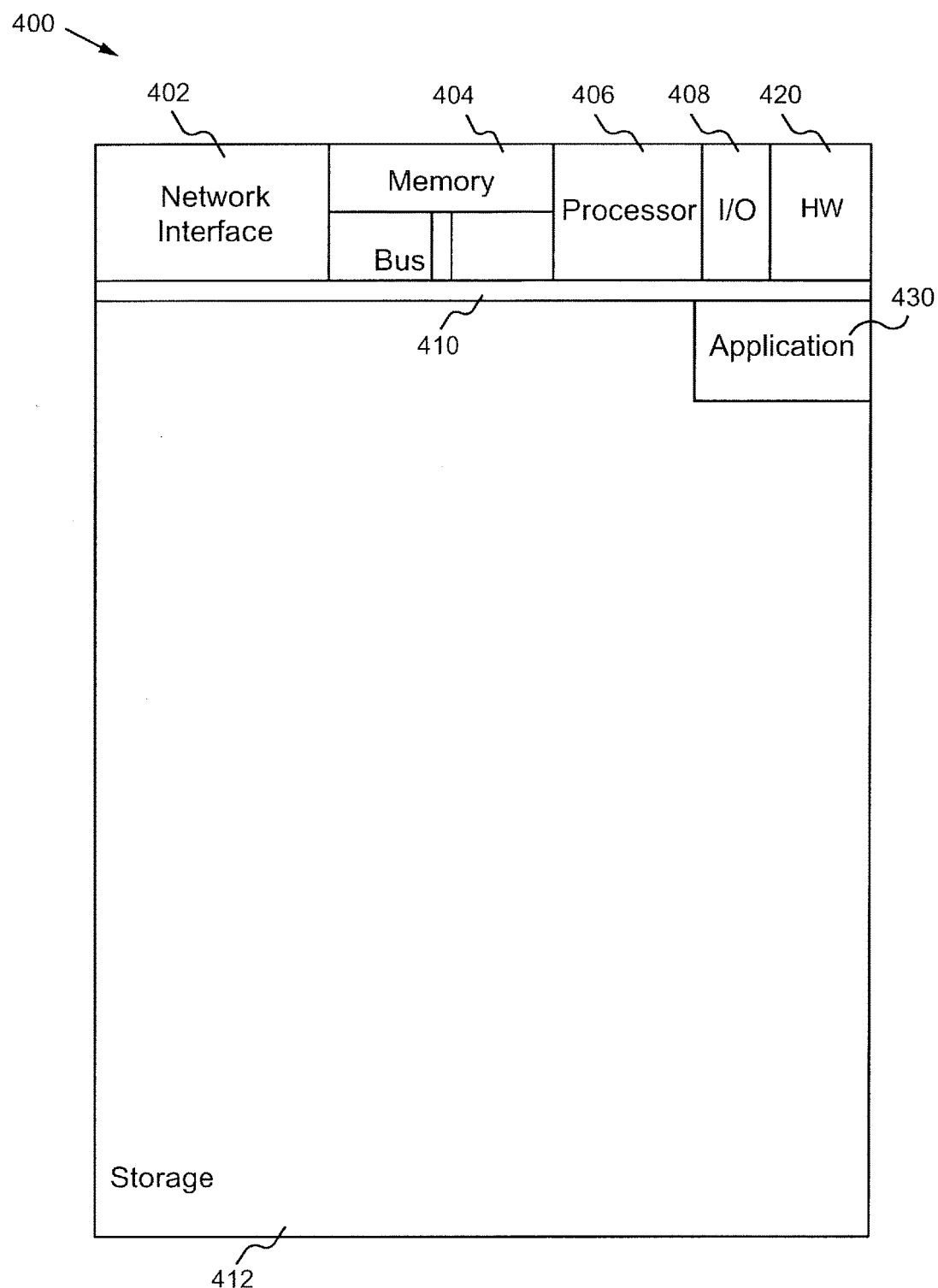
FIG. 4 illustrates a block diagram of an exemplary computing device configured to implement the supervoxel-based spatial temporal video segmentation method according to some embodiments.

FIG. 4 illustrates a block diagram of an exemplary computing device configured to implement the supervoxel-based spatial temporal video segmentation method according to some embodiments. The computing device 400 is able to be used to acquire, store, compute, process, communicate and/or display information such as images and videos. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen. The memory 404 is able to be any conventional computer memory known in the art. The storage device 412 is able to include a hard drive, CDROM, CDRW, DVD, DVDRW, High Definition disc/drive, ultra-HD drive, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, screen, printer, modem, touchscreen, button interface and other devices. Supervoxel-based spatial temporal video segmentation application(s) 430 used to perform the supervoxel-based spatial temporal video segmentation method are likely to be stored in the storage device 412 and memory 404 and processed as applications are typically processed. More or fewer components shown in FIG. 4 are able to be included in the computing device 400. In some embodiments, supervoxel-based spatial temporal video segmentation hardware 420 is included. Although the computing device 400 in FIG. 4 includes applications 430 and hardware 420 for the supervoxel-based spatial temporal video segmentation method, the supervoxel-based spatial temporal video segmentation method is able to be implemented on a computing device in hardware, firmware, software or any combination thereof. For example, in some embodiments, the supervoxel-based spatial temporal video segmentation applications 430 are programmed in a memory and executed using a processor. In another example, in some embodiments, the supervoxel-based spatial temporal video segmentation hardware 420 is programmed hardware logic including gates specifically designed to implement the supervoxel-based spatial temporal video segmentation method.

In some embodiments, the supervoxel-based spatial temporal video segmentation application(s) 430 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, smart jewelry (e.g., smart watch) or any other suitable computing device.

To utilize the supervoxel-based spatial temporal video segmentation method described herein, a device such as a digital camcorder is used to acquire a video. The supervoxel-based spatial temporal video segmentation method is automatically used for processing the acquired data. The supervoxel-based spatial temporal video segmentation method is able to be implemented automatically without user involvement.

In operation, the two-step architecture of the supervoxel-based spatial temporal video segmentation method ensures speed and scalability. The computationally intensive first step uses a highly efficient super-voxel segmentation method. The second step is done over pre-grouped super-voxels, hence has much lower temporal and spatial complexity. The progressive segmentation scheme deployed in the first step enables segmenting huge input volume part by part, without loading all the data into the memory which may be infeasible. At the same time, the progressive segmentation is able to effectively prevent seam artifacts, leading to segmentation results virtually identical to those of whole volume processing.

Some Embodiments of a Fast, Progressive Approach to Supervoxel-Based Spatial Temporal Video Segmentation 1. A method programmed in a non-transitory memory of a device comprising:
   a. acquiring video content;
   b. segmenting the video content into groups of super-voxels; and
   c. grouping the groups of super-voxels into segments.
2. The method of clause 1 wherein the voxels in each group of the groups of super-voxels are visually similar in color, texture or both.
3. The method of clause 2 wherein determining the voxels are visually similar in color is performed by comparing and matching the color, the texture or both.
4. The method of clause 1 wherein segmenting the video content into the groups of super-voxels includes over-segmentation.
5. The method of clause 4 wherein boundaries between super-voxels are preserved.
6. The method of clause 1 wherein segmenting the video content into the groups of super-voxels is by simple linear iterative clustering.
7. The method of clause 1 wherein segmenting the video content into the groups of super-voxels uses progressive segmentation which is part-by-part segmentation by splitting the video content into spatial-temporal pieces, and the spatial-temporal pieces are processed sequentially in a scan-line order.
8. The method of clause 7 wherein the progressive segmentation uses a front-line retreating strategy including: when processing each piece, a mask array marking the voxels that have been segmented is stored, wherein before segmentation, none of the voxels are marked, and after segmentation, every voxel is marked except for those belonging to super-voxels on the front-line boundary of a piece, wherein before a following piece is segmented, unmarked voxels of all processed neighboring pieces are added to a current piece, and all of the voxels are segmented into super-voxels using a selected segmentation method.
9. The method of clause 1 wherein grouping super-voxels into larger segments is based on a modified graph-based segmentation algorithm which groups super-voxels instead of individual voxels.
10. The method of clause 1 wherein grouping the groups of super-voxels into the segments includes measuring a dissimilarity between two super-voxels, including measuring an $X^2$ distance between a color histogram of the super-voxels.
11. A system comprising:
    a. a lens;

b. a sensor configured for acquiring video content; and
c. a processing component configured for segmenting the video content into groups of super-voxels and grouping the groups of super-voxels into segments.

12. The system of clause 11 wherein the voxels in each group of the groups of super-voxels are visually similar in color, texture or both.

13. The system of clause 12 wherein determining the voxels are visually similar in color is performed by comparing and matching the color, the texture or both.

14. The system of clause 11 wherein segmenting the video content into the groups of super-voxels includes over-segmentation.

15. The system of clause 14 wherein boundaries between super-voxels are preserved.

16. The system of clause 11 wherein segmenting the video content into the groups of super-voxels is by simple linear iterative clustering.

17. The system of clause 11 wherein segmenting the video content into the groups of super-voxels uses progressive segmentation which is part-by-part segmentation by splitting the video content into spatial-temporal pieces, and the spatial-temporal pieces are processed sequentially in a scan-line order.

18. The system of clause 17 wherein the progressive segmentation uses a front-line retreating strategy including: when processing each piece, a mask array marking the voxels that have been segmented is stored, wherein before segmentation, none of the voxels are marked, and after segmentation, every voxel is marked except for those belonging to super-voxels on the front-line boundary of a piece, wherein before a following piece is segmented, unmarked voxels of all processed neighboring pieces are added to a current piece, and all of the voxels are segmented into super-voxels using a selected segmentation method.

19. The system of clause 11 wherein grouping super-voxels into larger segments is based on a modified graph-based segmentation algorithm which groups super-voxels instead of individual voxels.

20. The system of clause 11 wherein grouping the groups of super-voxels into the segments includes measuring a dissimilarity between two super-voxels, including measuring an $X^2$ distance between a color histogram of the super-voxels.

21. A camera device comprising:
a. a lens;
b. a sensor configured for acquiring video content;
c. a non-transitory memory for storing an application, the application for:
 i. segmenting the video content into groups of super-voxels; and
 ii. grouping the groups of super-voxels into segments; and
d. a processing component coupled to the memory, the processing component configured for processing the application.

22. The camera device of clause 21 wherein the voxels in each group of the groups of super-voxels are visually similar in color, texture or both.

23. The camera device of clause 22 wherein determining the voxels are visually similar in color is performed by comparing and matching the color, the texture or both.

24. The camera device of clause 21 wherein segmenting the video content into the groups of super-voxels includes over-segmentation.

25. The camera device of clause 24 wherein boundaries between super-voxels are preserved.

26. The camera device of clause 21 wherein segmenting the video content into the groups of super-voxels is by simple linear iterative clustering.

27. The camera device of clause 21 wherein segmenting the video content into the groups of super-voxels uses progressive segmentation which is part-by-part segmentation by splitting the video content into spatial-temporal pieces, and the spatial-temporal pieces are processed sequentially in a scan-line order.

28. The camera device of clause 27 wherein the progressive segmentation uses a front-line retreating strategy including: when processing each piece, a mask array marking the voxels that have been segmented is stored, wherein before segmentation, none of the voxels are marked, and after segmentation, every voxel is marked except for those belonging to super-voxels on the front-line boundary of a piece, wherein before a following piece is segmented, unmarked voxels of all processed neighboring pieces are added to a current piece, and all of the voxels are segmented into super-voxels using a selected segmentation method.

29. The camera device of clause 21 wherein grouping super-voxels into larger segments is based on a modified graph-based segmentation algorithm which groups super-voxels instead of individual voxels.

30. The camera device of clause 21 wherein grouping the groups of super-voxels into the segments includes measuring a dissimilarity between two super-voxels, including measuring an $X^2$ distance between a color histogram of the super-voxels.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method programmed in a non-transitory memory of a device comprising:
a. acquiring video content;
b. segmenting the video content into groups of super-voxels; and
c. grouping the groups of super-voxels into segments, wherein segmenting the video content into the groups of super-voxels uses progressive segmentation which is part-by-part segmentation by splitting the video content into spatial-temporal pieces, and the spatial-temporal pieces are processed sequentially in a scan-line order, wherein the progressive segmentation uses a front-line retreating strategy including: when processing each piece, a mask array marking the voxels that have been segmented is stored, wherein before segmentation, none of the voxels are marked, and after segmentation, every voxel is marked except for those belonging to super-voxels on the front-line boundary of a piece, wherein before a following piece is segmented, unmarked voxels of all processed neighboring pieces are added to a current piece, and all of the voxels are segmented into super-voxels using a selected segmentation method.

2. The method of claim 1 wherein the voxels in each group of the groups of super-voxels are visually similar in color, texture or both.

3. The method of claim 2 wherein determining the voxels are visually similar in color is performed by comparing and matching the color, the texture or both.

4. The method of claim 1 wherein segmenting the video content into the groups of super-voxels includes over-segmentation.

5. The method of claim 4 wherein boundaries between super-voxels are preserved.

6. The method of claim 1 wherein segmenting the video content into the groups of super-voxels is by simple linear iterative clustering.

7. The method of claim 1 wherein grouping super-voxels into larger segments is based on a modified graph-based segmentation algorithm which groups super-voxels instead of individual voxels.

8. The method of claim 1 wherein grouping the groups of super-voxels into the segments includes measuring a dissimilarity between two super-voxels, including measuring a distance between a color histogram of the super-voxels.

9. A system comprising:
 a. a lens;
 b. a sensor configured for acquiring video content; and
 c. a processing component configured for segmenting the video content into groups of super-voxels and grouping the groups of super-voxels into segments, wherein segmenting the video content into the groups of super-voxels uses progressive segmentation which is part-by-part segmentation by splitting the video content into spatial-temporal pieces, and the spatial-temporal pieces are processed sequentially in a scan-line order, wherein the progressive segmentation uses a front-line retreating strategy including: when processing each piece, a mask array marking the voxels that have been segmented is stored, wherein before segmentation, none of the voxels are marked, and after segmentation, every voxel is marked except for those belonging to super-voxels on the front-line boundary of a piece, wherein before a following piece is segmented, unmarked voxels of all processed neighboring pieces are added to a current piece, and all of the voxels are segmented into super-voxels using a selected segmentation method.

10. The system of claim 9 wherein the voxels in each group of the groups of super-voxels are visually similar in color, texture or both.

11. The system of claim 10 wherein determining the voxels are visually similar in color is performed by comparing and matching the color, the texture or both.

12. The system of claim 9 wherein segmenting the video content into the groups of super-voxels includes over-segmentation.

13. The system of claim 12 wherein boundaries between super-voxels are preserved.

14. The system of claim 9 wherein segmenting the video content into the groups of super-voxels is by simple linear iterative clustering.

15. The system of claim 9 wherein grouping super-voxels into larger segments is based on a modified graph-based segmentation algorithm which groups super-voxels instead of individual voxels.

16. The system of claim 9 wherein grouping the groups of super-voxels into the segments includes measuring a dissimilarity between two super-voxels, including measuring a distance between a color histogram of the super-voxels.

17. A camera device comprising:
 a. a lens;
 b. a sensor configured for acquiring video content;
 c. a non-transitory memory for storing an application, the application for:
  i. segmenting the video content into groups of super-voxels; and
  ii. grouping the groups of super-voxels into segments, wherein segmenting the video content into the groups of super-voxels uses progressive segmentation which is part-by-part segmentation by splitting the video content into spatial-temporal pieces, and the spatial-temporal pieces are processed sequentially in a scan-line order, wherein the progressive segmentation uses a front-line retreating strategy including: when processing each piece, a mask array marking the voxels that have been segmented is stored, wherein before segmentation, none of the voxels are marked, and after segmentation, every voxel is marked except for those belonging to super-voxels on the front-line boundary of a piece, wherein before a following piece is segmented, unmarked voxels of all processed neighboring pieces are added to a current piece, and all of the voxels are segmented into super-voxels using a selected segmentation method; and
 d. a processing component coupled to the memory, the processing component configured for processing the application.

18. The camera device of claim 17 wherein the voxels in each group of the groups of super-voxels are visually similar in color, texture or both.

19. The camera device of claim 18 wherein determining the voxels are visually similar in color is performed by comparing and matching the color, the texture or both.

20. The camera device of claim 17 wherein segmenting the video content into the groups of super-voxels includes over-segmentation.

21. The camera device of claim 20 wherein boundaries between super-voxels are preserved.

22. The camera device of claim 17 wherein segmenting the video content into the groups of super-voxels is by simple linear iterative clustering.

23. The camera device of claim 17 wherein grouping super-voxels into larger segments is based on a modified graph-based segmentation algorithm which groups super-voxels instead of individual voxels.

24. The camera device of claim 17 wherein grouping the groups of super-voxels into the segments includes measuring a dissimilarity between two super-voxels, including measuring a distance between a color histogram of the super-voxels.

\* \* \* \* \*